Patented May 21, 1940

2,201,891

UNITED STATES PATENT OFFICE 2,201,891

COATED AND IMPREGNATED FABRIC

Donald Edwards Edgar, Philadelphia, and Paul Robinson, Llanerch, Pa., assignors to E. I. du Pont de Nemours & Company, Wilmington, Del., a corporation of Delaware No Drawing. Application December 1, 1936, Serial No. 113,744. Renewed June 17, 1938

9 Claims. (Cl. 91—68)

This invention relates to coated and impregnated fabrics and more particularly to fabrics coated or impregnated with resinous products obtained from the reaction of urea and an aldehyde.

This application is a continuation-in-part of our application Serial Number 58,000, filed January 7, 1936.

Various types of compositions have been used as protective and decorative coatings for fabrics the particular type of composition depending largely on the intended use of the treated fabric and in many instances economic considerations. Among such compositions may be mentioned cellulose derivatives suitably softened with various types of softeners and/or plasticizers, natural and synthetic resins, rubber compounds and synthetic products, raw or treated animal or vegetable oils, etc. Such compositions are used either with or without pigments or other coloring matter. Certain types of coating compositions are found to be more satisfactory than others for particular types of fabrics. For example in coating or impregnating natural silk or synthetic products simulating silk or even light weight cotton yarn fabrics the raw or treated animal or vegetable oil compositions are quite extensively used. Products so made with silk or synthetic fabrics are commonly known as oiled silk fabrics. These products find extensive use for various purposes such as, for example, rain coats or capes, tobacco pouches, linings for water-proof bags, etc. These oiled silk products however possess certain disadvantages chief among which is their tendency to become stiff when subjected to lowered temperatures and under such conditions to crack readily even on slight folding or bending. Further they are rather expensive to prepare due to the necessity of long period of drying or "curing" of the compositions in order to produce a dry surface. The oil compositions although of value in the manufacture of oiled silk fabrics because they produce the highly desired transparent coatings, do not produce a so-called water white coating but rather a coating which varies in color from a light straw to a dark amber. The various types of natural or synthetic resins which have been used possess certain disadvantages with respect to raw or treated animal or vegetable oils chief among which is their dark color. A product which therefore is substantially water white in color, will retain its softness and pliability at lowered temperatures as well as at normal temperatures and which can be produced economically is highly desirable.

It is therefore the object of this invention to produce a coated or impregnated fabric which is substantially water white in color or possesses desirable properties such as waterproofness, etc., will not appreciably lose its softness and pliability or crack on folding or bending when subjected to lowered temperatures and which is economical to manufacture.

This and other objects which will be apparent from the description of the invention are accomplished by using as the impregnating or coating composition the resinous reaction product of urea, an aldehyde and an alcohol.

In the above mentioned application there is described and claimed a process for producing a urea-aldehyde-alcohol resinous reaction product particularly suitable as a coating or impregnating medium in the present invention. This urea-aldehyde resinous product may for certain purposes be used as such but for most purposes it is desirable to blend it with other materials with which it is compatible in order to impart certain additional desirable properties. Among such non-volatile blending agents are oil modified alkyl resins, other types of synthetic resins, oleoresinous varnishes, lacquers prepared from cellulose nitrate, ethyl cellulose, benzyl cellulose, etc., raw or treated drying oils, non-drying oils, waxes, natural resins as Copal, Damar, shellac, etc. Further the resinous reaction product may be softened with plasticizing materials as dibutyl phthalate, tricresyl phosphate, triphenyl phosphate, dicylclohexyl phthalate, ethyl and butyl tartrate, camphor, ethyl and butyl lactate, hydrogenated castor oil phthalate, chlorinated diphenyl, chlorinated naphthalene, etc., with or without other blending materials as noted above.

The present invention is carried out by applying to the fabric a suitably blended composition of the urea-aldehyde reaction product by means well known in the coating and impregnating art as for example by spray coating, roller coating, doctor knife or by passing the fabric through the composition and pressing out any excess composition. This latter procedure impregnates the fabric whether it be of a woven or non-woven type in addition to applying a surface coating. Where the regular coating procedures are used the fabric may be coated on one or both sides, the choice depending upon the use for which the material is intended. After the coating composition has been applied it is dried by any suitable means as for example by festooning in a heated chamber or by simply passing through a suitably heated chamber such as is usually attached to coating equipment. The coating composition may be air dried or dried at an elevated temperature. For example the compositions have been found to dry satisfactorily at approximately 212° F. in about 30 minutes. At higher temperatures as between 270 and 295° F. the material may be satisfactorily dried in 5 minutes or even less time. The drying means, time and temperature may be conveniently regulated to suit particular equipment used and other general manufacturing conditions.

The urea-formaldehyde-alcohol reaction product used in the present invention is made by the method described in our mentioned prior application. There is reacted in the presence of an acid or other catalyst (mercuric, aluminum, ferric, or stannic chlorides, acid resins, halogens, etc.) ingredients consisting solely or essentially of urea, formaldehyde, and a monohydric aliphatic alcohol. The heating of the reaction product of the urea and formaldehyde with the alcohol is continued in the presence of a hydrocarbon, such as benzene or toluene with separation of water of reaction from the condensed hydrocarbon and return of the latter to the reaction mixture until substantially two molecules of water for each molecule of urea are eliminated and a product is obtained which contains an amount of combined monohydric alcohol equivalent from one-half to about one molecule of alcohol for each molecule of urea. In accordance with this procedure a mixture containing all the ingredients may be reacted or the alcohol may be heated, accompanied by the mentioned separation of water, with preformed urea-aldehyde reaction product. With the use of some alcohols it may not be necessary to use in addition a hydrocarbon since the water may be satisfactorily removed by other means, as for instance by the use of silica gel in the separation, or by the use of an auxiliary fractionating column to separate the water from the alcohol before the latter is returned to the reaction vessel. These resins yield upon treatment with zinc chloride and acetic anhydride the acetate of the alcohol.

The following examples, in which the parts are by weight, illustrate suitable compositions of the urea-aldehyde-alcohol resinous reaction product blended and/or softened with other materials.

*Example I*

| | Parts |
|---|---|
| Urea-formaldehyde-alcohol reaction product | 40 |
| Pale blown castor oil | 60 |

The pale blown castor oil in this composition may conveniently range between 45 and 65 parts.

*Example II*

| | Parts |
|---|---|
| Urea-formaldehyde-alcohol reaction product | 40 |
| Hydrogenated castor oil phthalate | 60 |

The hydrogenated castor oil phthalate may vary within a range of between 40 and 70 parts.

*Example III*

| | Parts |
|---|---|
| Urea-formaldehyde-alcohol reaction product | 60 |
| Chlorinated naphthalene (liquid type) | 40 |

The chlorinated naphthalene in this composition may vary between 25 and 50 parts.

The resin used in the foregoing examples was made by reacting under the conditions outlined above a solution of 250 parts by weight paraformaldehyde in 1000 parts normal butyl alcohol with 250 parts urea.

Other blending and softening agents may be used with the urea-formaldehyde resinous material in the preparation of compositions such as will produce coatings having particularly desirable properties. The choice of the most suitable blending and/or softening agents to be used with the urea-formaldehyde-alcohol resinous material will be readily apparent to those skilled in the art of manufacturing such products.

Various types of fabrics may be coated with the compositions of the invention. For example in making a material similar to the so-called oiled silk, but with improved properties, the use of a Habutai No. 6 Mummy silk (weighing approximately 0.7 ounce per square yard) was found to yield a very satisfactory product. Silks of other weights and types may be used as well as various types and weights of fabrics made of synthetic yarns as, for example, cellulose acetate, viscose, cuprammonium cellulose, etc. Cotton fabrics of various weights and weaves such as sheetings, ducks or canvas, drills and other twill weave fabrics can be conveniently coated or impregnated with the compositions. Further yarns, cords, etc., of various vegetable and animal fibers as well as felted materials of various types may be treated with the compositions of the invention. The amount of composition applied to the fabric may vary over a wide range and will be largely governed by the weight and type of the fabric being treated as well as the particular use for which the finished product is intended.

The compositions may be used as such to produce clear transparent coatings or they may be pigmented or dyed to produce colored coatings which in the case of a dye being used will still be transparent. Fillers may also be added if desired. The solids content of the compositions may conveniently range between 40 and 70% and if it is desired to reduce the solids content this may be done by dilution with an aromatic hydrocarbon such as solvent naphtha, toluol, xylol or an ester solvent such as ethyl acetate with or without an alcohol as ethyl alcohol. The addition of preferably 0.1% of ortho-phosphoric acid based on the urea-formaldehyde resinous product improves the drying and reduces the drying time. The amount of phosphoric acid may vary between 0.05 and 0.50%. The phosphoric acid is conveniently introduced in a butyl or isobutyl alcohol solution using an approximately 10% solution of the 85% $H_3PO_4$ syrup. If desired a 5% solution in ethyl alcohol of phosphorous pentoxide may be used in place of the phosphoric acid, the amount used being within the range previously noted.

The products of the invention where light weight fabrics are coated may be used for raincoats or capes, umbrellas, tobacco pouches, waterproof bags, linings for luggage of various types, and in fact wherever a waterproof, wear resistant, soft and pliable coated material is desirable or necessary. Fish lines may be treated with compositions to make them waterproof and increase their service life without materially affecting their other properties. Heavy cotton fabrics such as canvas and ducks may be treated and used for making tents, etc. Heavy canvas impregnated with the compositions may be adapted for use in the manufacture of automotive vehicle brake linings. Because of the desirable properties imparted to the fabrics by the compositions many uses will be suggested for the products prepared as described.

The products of the invention possess as advantages over similar material made according to the present state of the art improved initial flexibility and retention of pliability in service, retention of pliability when subjected to reduced temperatures and resistance to cracking on being folded and subjected to low temperatures, translucency and a so-called water white color and a marked resistance to cracking on folding and abrasion in service. Further, since the compositions can be dried in a much shorter period of time their use presents marked economic advantages in the manufacturing operations.

As many apparently widely different embodiments of this invention may be made without departing from the spirit and scope thereof, it is to be understood that we do not limit ourselves to the specific embodiments thereof except as defined in the appended claims.

We claim:

1. A fabric having applied to at least one side thereof a composition comprising a urea-aldehyde-monohydric-alcohol resinous product and a substantially non-volatile blending agent, said resinous product containing said alcohol in combined form in amount of from about one-half to about one molecule of alcohol for each molecule of urea, said product yielding upon treatment with zinc chloride and acetic anhydride the acetate of said alcohol.

2. An article of manufacture of the class consisting of yarns and cords, said article comprising a urea-aldehyde-monohydric-alcohol resinous product and a substantially non-volatile blending agent, said resinous product containing said alcohol in combined form in amount of from about one-half to about one molecule of alcohol for each molecule of urea, said product yielding upon treatment with zinc chloride and acetic anhydride the acetate of said alcohol.

3. A fabric having applied to at least one side thereof a composition comprising a urea-aldehyde-monohydric-alcohol resinous product and a softening agent, said resinous product containing said alcohol in combined form in amount of from about one-half to about one molecule of alcohol for each molecule of urea, said product yielding upon treatment with zinc chloride and acetic anhydride the acetate of said alcohol.

4. A fabric having applied to at least one side thereof a composition comprising a urea-aldehyde-monohydric-alcohol resinous product and a substantially non-volatile blending agent together with a softening agent, said resinous product containing said alcohol in combined form in amount of from about one-half to about one molecule of alcohol for each molecule of urea, said product yielding upon treatment with zinc chloride and acetic anhydride the acetate of said alcohol.

5. A silk fabric impregnated with a urea-aldehyde-monohydric-alcohol resinous product and a substantially non-volatile softening agent selected from the group comprising blown castor oil and hydrogenated castor oil phthalate, said resinous product containing said alcohol in combined form in amount of from about one-half to about one molecule of alcohol for each molecule of urea, said product yielding upon treatment with zinc chloride and acetic anhydride the acetate of said alcohol.

6. A fabric having applied to at least one side thereof a composition comprising a urea-aldehyde-monohydric-alcohol resinous product, a substantially non-volatile blending agent, a softening agent and ortho-phosphoric acid, said resinous product containing said alcohol in combined form in amount of from about one-half to about one molecule of alcohol for each molecule of urea, said product yielding upon treatment with zinc chloride and acetic anhydride the acetate of said alcohol.

7. An article of manufacture comprising a flexible fibrous fabric having a pliable, substantially water-white transparent coating which retains its pliability at lowered temperatures, said coating being the resinous reaction product of ingredients consisting essentially of urea, formaldehyde, and an aliphatic monohydric alcohol and containing from about one-half to about one molecule of said alcohol for each molecule of urea.

8. An article of manufacture comprising a flexible fibrous fabric having a pliable coating which comprises the resinous reaction product of ingredients consisting essentially of urea, formaldehyde, and an aliphatic monohydric alcohol and containing from about one-half to about one molecule of said alcohol for each molecule of urea.

9. An article of manufacture comprising a flexible fibrous fabric having a pliable coating which comprises a blend of oil modified alkyd resin and the resinous reaction product of ingredients consisting essentially of urea, formaldehyde, and an aliphatic monohydric alcohol and containing from about one-half to about one molecule of said alcohol for each molecule of urea.

DONALD EDWARDS EDGAR.
PAUL ROBINSON.